United States Patent
Kasuga et al.

(10) Patent No.: US 7,157,391 B2
(45) Date of Patent: *Jan. 2, 2007

(54) OPTICAL GLASS, PREFORM FOR PRESS MOLDING AND OPTICAL ELEMENT

(75) Inventors: Yoshiko Kasuga, Tokyo (JP); Xuelu Zou, Tokyo (JP)

(73) Assignee: Hoya Corporation, Tokyo (JP)

( * ) Notice: Subject to any disclaimer, the term of this patent is extended or adjusted under 35 U.S.C. 154(b) by 154 days.

This patent is subject to a terminal disclaimer.

(21) Appl. No.: 10/744,096

(22) Filed: Dec. 24, 2003

(65) Prior Publication Data

US 2004/0138043 A1    Jul. 15, 2004

(30) Foreign Application Priority Data

Dec. 27, 2002   (JP) .............................. 2002-380540

(51) Int. Cl.
*C03C 3/16* (2006.01)
*C03C 3/19* (2006.01)

(52) U.S. Cl. ......................................... 501/45; 501/47
(58) Field of Classification Search ............ 501/45–48, 501/903
See application file for complete search history.

(56) References Cited

U.S. PATENT DOCUMENTS

| | | | | |
|---|---|---|---|---|
| 5,021,366 A * | 6/1991 | Aitken | ......................... | 501/45 |
| 5,153,151 A * | 10/1992 | Aitken | ......................... | 501/45 |
| 5,256,604 A * | 10/1993 | Aitken | ......................... | 501/45 |
| 5,668,066 A * | 9/1997 | Oguma et al. | ................. | 501/45 |
| 5,711,779 A * | 1/1998 | Havewala et al. | .......... | 65/134.1 |
| 6,127,297 A * | 10/2000 | Hashimoto | .................... | 501/46 |
| 6,514,891 B1 * | 2/2003 | Lee | .............. | 501/32 |
| 6,667,258 B1 * | 12/2003 | Quinn | ......................... | 501/48 |
| 6,743,743 B1 * | 6/2004 | Sato | ............................ | 501/47 |
| 6,784,128 B1 * | 8/2004 | Otsuka et al. | ................ | 501/48 |
| 2002/0042337 A1 * | 4/2002 | Zou et al. | ..................... | 501/45 |
| 2004/0087428 A1 * | 5/2004 | Otsuka et al. | ................ | 501/48 |
| 2004/0092378 A1 * | 5/2004 | Wolff et al. | ................... | 501/45 |
| 2004/0170700 A1 * | 9/2004 | Numaguchi et al. | ........ | 424/602 |
| 2004/0259714 A1 * | 12/2004 | Fujiwara et al. | .............. | 501/45 |
| 2005/0003948 A1 * | 1/2005 | Yamazaki | ..................... | 501/45 |
| 2005/0049132 A1 * | 3/2005 | Shiraishi | ....................... | 501/46 |
| 2005/0054511 A1 * | 3/2005 | Fujiwara et al. | .............. | 501/45 |
| 2005/0192174 A1 * | 9/2005 | Yamamoto et al. | ........... | 501/45 |

FOREIGN PATENT DOCUMENTS

| JP | 11-139845 A | 5/1999 |
|---|---|---|
| JP | 2000-072474 | 3/2000 |

* cited by examiner

*Primary Examiner*—J. A. Lorengo
*Assistant Examiner*—Elizabeth A. Bolden
(74) *Attorney, Agent, or Firm*—Nixon & Vanderhye P.C.

(57) ABSTRACT

An optical glass being free of lead and fluorine, having a low glass transition temperature permitting press-molding with a mold formed of stainless steel and having high climate resistance includes an optical glass comprising, by mol %, 25 to 44% of $P_2O_5$, 10 to 40% of a total of $Li_2O$, $Na_2O$ and $K_2O$, 5 to 40% of ZnO, 1 to 35% of BaO and at least one components selected from $Nb_2O_5$, $Bi_2O_3$ and $WO_3$, having a glass transition temperature (Tg) of 370° C. or lower and being free of lead and fluorine and an optical glass which is free of lead and fluorine, has a mass loss ratio of less than 0.25% when immersed in pure water, and has a glass transition temperature (Tg) of 370° C. or lower.

8 Claims, 2 Drawing Sheets

OPTICAL GLASS, PREFORM FOR PRESS MOLDING AND OPTICAL ELEMENT

This application claims priority to Japan Application No. 2002-380540, filed 27 Dec. 2002. The entire contents of this application are incorporated herein by reference.

BACKGROUND OF THE INVENTION

1. Field of the Invention

The present invention relates to an optical glass, a preform for press-molding (a press-molding preform), a process for preparing the preform, an optical element and a process for producing the optical element. More specifically, the present invention relates to an optical glass that is free of lead and fluorine, which has a low transition temperature compatible with molding with a mold formed of stainless steel and which has high climate resistance, a press-molding preform formed of the above optical glass, a process for preparing the preform, an optical element formed of the above optical glass and a process for producing an optical element by press-molding the above preform.

2. Prior Art

Generally, a method of precision press-molding of a glass is known as a method of producing an optical-function surface of an aspherical lens or the like by press-molding, and according to the method, there can be provided an optical element formed of an optical glass having an optical-function surface that is difficult to form or takes a very long time by grinding and polishing, highly productively at a low cost. When a press-molded product is obtained by the above precision press-molding, a glass having a low glass transition temperature (Tg) is advantageous for decreasing the press-molding temperature so that destruction and deterioration of a press mold can be prevented.

For the above purpose, of optical glasses, a glass having a relatively low glass transition temperature of 500 to 600° C. is used as a glass for precision press-molding. And, it is general practice to carry out the press-molding as follows. Such a glass having a low glass transition temperature is used, a highly refractory mold material such as ceramic is used for a mold for the press-molding, the molding surface of a mold is provided with a mold release film for preventing the fusion of the mold and the glass, and the press-molding is carried out in a non-oxidative atmosphere for preventing the deterioration of the mold caused by oxidation.

Meanwhile, some optical elements produced by a precision press-molding are required to attain higher form accuracy with regard to its form including an optical-function surface. For example, in an image sensing optical system for mobile items, the number of lenses tends to be decreased for downsizing. It is therefore required to correct the aberration, etc., excellently with a decreased number of lenses, and a lens having a special form comes to be required, or it is required to further improve a lens in form accuracy. Further, with an increase in the number of pixels of an image sensing device, the optical system is required to have far higher-level performances.

For producing such an optical element by precision press-molding, a press mold having higher accuracy is required, and for preparing such a mold, a cutting process and an electric-discharging process are suitable. However, although a conventional ceramic mold material is excellent as a press mold material, the problem is that it is difficult to cut the ceramic mold material.

On the other hand, as a material that permits cutting and higher-accuracy processing, there is a metallic material such as stainless steel, which is used as a material for a mold used for producing a plastic lens by injection molding. However, stainless steel is not durable against the temperature of 500° C. or higher that is required for press-molding a glass. Further, when a mold formed of stainless steel is repeatedly used at a temperature of 400° C. or higher, the mold surface is roughened and becomes fragile, so that the stainless steel is unsuitable as a material for a mold for precision press-molding.

For using a press mold formed of stainless steel, there is required a glass that can be press molded at a temperature lower than 400° C.

Attempts have been made to decrease the glass transition temperature to a great extent by incorporating lead, or attempts have been made to form a glass having a lower glass transition temperature by introducing fluorine, although these attempts have not been intended for using a press mold formed of stainless steel. However, although lead is a component effective for decreasing the glass transition temperature, lead is a component whose use should be controlled for a reason that it causes a detrimental effect on environments. Further, fluorine has the following problem. Since fluorine exhibits high volatility at a high temperature, it causes striae due to volatilization when a press-molding preform is prepared from a molten glass, so that it is difficult to prepare a preform stably. Further, a substance volatilized from a glass adheres to a press mold during press-molding, so that the substance decreases or degrades the form accuracy of the press mold. Therefore, it is desired to provide a glass free of lead and fluorine, and there are proposed optical glasses free of lead and fluorine (for example, JP-A-11-139845 and JP-A-2000-72474).

The invention of JP-A-11-139845 seeks to impart a glass with a low-temperature softening property while overcoming the problem caused by the introduction of lead and fluorine. In the glass disclosed in the above Publication, however, the amount of an alkali metal oxide as a component for decreasing the glass transition temperature is insufficient, so that it is difficult to decrease the sag temperature of the glass to 400° C. or lower. When the glass described in the above Publication is press-molded, it is impossible to use a mold formed of stainless steel.

On the other hand, the glass disclosed in JP-A-2000-72474 has a $P_2O_5$ content of 48 to 58% by weight, so that the thermal stability, that is, the devitrification resistance of the glass is decreased, and the climate resistance thereof is also degraded. The devitrification resistance is a property required for preventing the impairment of transparency of a glass when a press-molding preform is shaped from a molten glass. Further, one of advantages that a glass has over plastics is that the glass has high climate resistance. However, if the climate resistance of a glass is degraded as described above, the advantage of the glass over plastic materials is impaired.

SUMMARY OF THE INVENTION

Under the circumstances, it is an object of the present invention to provide an optical glass that is free of lead and fluorine, which has a low glass transition temperature permitting press-molding with a mold formed of stainless steel, and which has high climate resistance, a press-molding preform, which is formed of the above optical glass, and a process for the preparation thereof. Another object of the present invention is to provide an optical element formed of the above optical glass and a process for producing an optical element, which comprises press-molding the above preform.

For achieving the above objects, the present inventors have made diligent studies and as a result have found that the above objects can be achieved by an optical glass having a specific composition, having a glass transition temperature of a predetermined value or less and being free of lead and fluorine, or an optical glass being free of lead and fluorine, having a mass loss ratio of a predetermined value or less when the glass is immersed in pure water and having a glass transition temperature of a predetermined value or less. On the basis of the above finding, the present invention has been completed.

That is, the subject matters of the present invention are as follows.

(1) An optical glass comprising, by mol %, 25 to 44% of $P_2O_5$, 10 to 40% of a total of $Li_2O$, $Na_2O$ and $K_2O$, 5 to 40% of ZnO, 1 to 35% of BaO and at least one components selected from $Nb_2O_5$, $Bi_2O_3$ and $WO_3$, having a glass transition temperature (Tg) of 370° C. or lower and being free of lead and fluorine (to be referred to as "optical glass I" hereinafter).

(2) An optical glass as recited in the above (1), which contains, by mol %, 5 to 30% of $Li_2O$, 0 to 25% of $Na_2O$, 0 to 15% of $K_2O$, 0.1 to 15% of a total of $Nb_2O_5$, $Bi_2O_3$ and $WO_3$, 0 to 10% of $B_2O_3$, 0 to 5% of $La_2O_3$, 0 to 5% of $Gd_2O_3$ and 0 to 5% of $Y_2O_3$, wherein the total content of $P_2O_5$, ZnO, BaO and said components is at least 96%.

(3) An optical glass which is free of lead and fluorine, has a mass loss ratio of less than 0.25% when the optical glass is immersed in pure water (100° C., 60 minutes), and has a glass transition temperature (Tg) of 370° C. or lower (to be referred to as "optical glass II" hereinafter).

(4) An optical glass as recited in any one of the above (1) to (3), which has a refractive index (nd) of 1.52 to 1.7 and an Abbe's number (vd) of 42 to 70.

(5) A press-molding preform formed of the optical glass recited in any one of the above (1) to (4).

(6) A process for preparing a press-molding preform, which comprises shaping a molten glass of the optical glass recited in any one of the above (1) to (4) while the molten glass having a predetermined weight is in a softened state, into the preform having a weight equivalent to said predetermined weight.

(7) An optical element formed of the optical glass recited in any one of the above (1) to (4).

(8) A process for producing an optical element, which comprises heating the press-molding preform recited in the above (5) or a press-molding preform prepared by the method recited in the above (6), and press-molding the preform.

PREFERRED EMBODIMENTS OF THE INVENTION

<Optical Glass>

Figure 1:
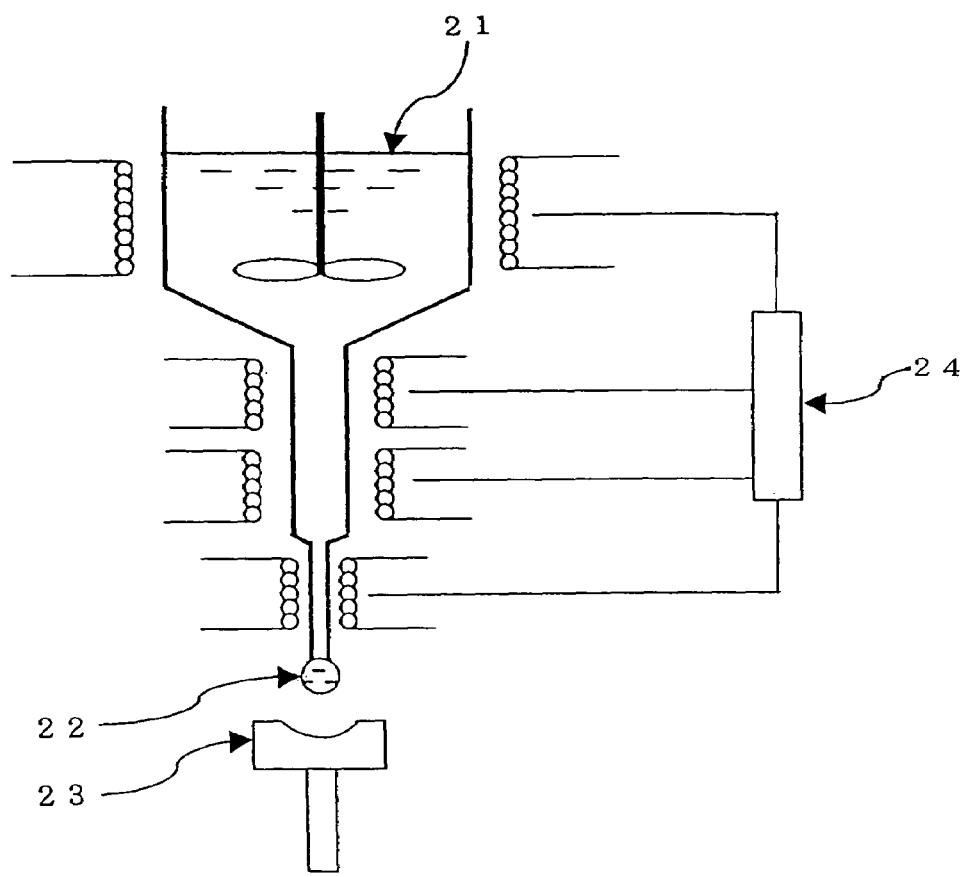
FIG. 1 is a schematic cross-sectional view of a preform-shaping apparatus used in Examples.

First, the optical glass of the present invention will be explained.

The glass transition temperature (Tg) is a factor that determines a temperature required when a glass is softened under heat and press-molded. By decreasing the glass transition temperature, the temperature for heating a press-molding preform (a preform for press-molding) during the operation of press-molding and the temperature for heating a press mold can be decreased. When the glass transition temperature can be further decreased so that the temperature to which a press mold is exposed during the operation of press-molding may be decreased to less than 400° C., a press mold formed of stainless steel having excellent processability can be used. When exposed to a high temperature of 400° C. or higher, stainless steel is surface-roughened or increasingly embrittled, so that it cannot be used as a material for a press mold.

The glass transition temperature of a glass that is press-moldable in a press mold formed of stainless steel is 370° C. or lower. Further, for a mold having durability against mass production, an optical glass having a glass transition temperature of 360° C. or lower is preferred, an optical glass having a glass transition temperature of 350° C. or lower is more preferred, and an optical glass having a glass transition temperature of 340° C. or lower is still more preferred.

The optical glass of the present invention is free of lead and fluorine. That is, none of lead and fluorine materials is used. Lead is a raw material that should not be used by taking account of its influence on environments due to its toxicity. Further, there is caused a problem that when an optical glass containing lead is softened under heat and press-molded in a non-oxidizing atmosphere such as nitrogen gas, lead oxide in the glass is reduced to cause the glass surface to become cloudy or adheres to the press mold. On the other hand, fluorine has high volatility, so that there is a problem that it volatilizes during the shaping of a molten glass into a press-molding preform, to cause striae or an altered layer in the glass, or that it volatilizes during press-molding and adheres to a press mold. The above problems can be therefore overcome by precluding lead and fluorine from the glass.

Further, the optical glass of the present invention has excellent durability using water resistance as an index.

The optical glass of the present invention includes two embodiments, the optical glass I and the optical glass II, each of which will be explained below.

[Optical Glass I]

The optical glass I is an optical glass comprising, by mol %, 25 to 44% of $P_2O_5$, 10 to 40% of a total of $Li_2O$, $Na_2O$ and $K_2O$, 5 to 40% of ZnO, 1 to 35% of BaO and at least one components selected from $Nb_2O_5$, $Bi_2O_3$ and $WO_3$, having a glass transition temperature (Tg) of 370° C. or lower, preferably 360° C. or lower, and being free of lead and fluorine. Desirably, the content of $P_2O_5$ by weight % is 46% or less, and the total content of $Li_2O$, $Na_2O$ and $K_2O$ by weight % is 10% or less. Contents shown by % hereinafter stand for contents by mol % unless otherwise specified.

In the optical glass I, a glass having a $P_2O_5$—$R_2O$ (R=Li, Na, K)—ZnO—BaO system is used as a base, at least one components selected from $Nb_2O_5$, $Bi_2O_3$ and $WO_3$ is incorporated, the content of BaO is in a broad range, and the contents of $Li_2O$, $Na_2O$ and $K_2O$ are decreased, whereby the glass is greatly improved in stability and climate resistance while decreasing the glass transition temperature.

When the optical glass I contains no $Bi_2O_3$, it is preferred to adjust the content of $TiO_2$ to less than 2%, and it is more preferred to adjust the content of $TiO_2$ to 1.5% or less.

The optical glass I is preferably a glass having a composition containing 5 to 30% of $Li_2O$, 0 to 25% of $Na_2O$, 0 to 15% of $K_2O$, 0.1 to 15% of a total of $Nb_2O_5$, $Bi_2O_3$ and $WO_3$, 0 to 10% of $B_2O_3$, 0 to 5% of $La_2O_3$, 0 to 5% of $Gd_2O_3$ and 0 to 5% of $Y_2O_3$, wherein the total content of $P_2O_5$, ZnO, BaO and said components is at least 96%.

The optical glass I is more preferably a glass having a composition containing 25 to 38% of $P_2O_5$, 7 to 25% of $Li_2O$, 0 to 20% of $Na_2O$, 0 to 10% of $K_2O$, the total content of $Li_2O$, $Na_2O$ and $K_2O$ being 20 to 40%, 7 to 30% of ZnO, 5 to 20% of BaO, less than 8% of $B_2O_3$, 0 to 3% of $La_2O_3$, 0 to 3% of $Gd_2O_3$, 0 to 3% of $Y_2O_3$, 0 to 2% of $Al_2O_3$ and 0 to 2% of $TiO_2$, wherein the total content of the above components is at least 98%.

The optical glass I is still more preferably a glass having a composition containing 25 to 38% of $P_2O_5$, 7 to 25% of $Li_2O$, 0 to 20% of $Na_2O$, 0 to 10% of $K_2O$, the total content of $Li_2O$, $Na_2O$ and $K_2O$ being 20 to 40%, 7 to 30% of ZnO, 5 to 20% of BaO, less than 8% of $B_2O_3$, 0 to 3% of $La_2O_3$, 0 to 3% of $Gd_2O_3$, 0 to 3% of $Y_2O_3$, 0 to 2% of $Al_2O_3$ and 0 to 1.5% of $TiO_2$, wherein the total content of the above components is at least 98%.

Further, generally, the optical glass I includes the following preferred glass compositions (i) to (iii).

(i) A glass composition in which the total content of $Nb_2O_5$, $Bi_2O_3$ and $WO_3$ is 1 to 15%, more preferably 2 to 12%, still more preferably 1 to 8%.

(ii) A glass composition in which the total content of $Li_2O$, $Na_2O$ and $K_2O$ is 22 to 35%.

(iii) A glass composition containing at least one of $Na_2O$ and $K_2O$.

In addition, a composition satisfying both the above (i) and (ii), a composition satisfying both the above (ii) and (iii), a composition satisfying both the above (iii) and (i) and a composition satisfying the above (i), (ii) and (iii) are more preferred.

Concerning all of the above glass compositions, a composition in which the total content of $P_2O_5$ $Li_2O$, $Na_2O$, $K_2O$, ZnO, BaO, $Nb_2O_3$, $Bi_2O_3$, $WO_3$, $B_2O_3$, $La_2O_3$, $Gd_2O_3$, $Y_2O_3$, $Al_2O_3$ and $TiO_2$ is at least 99% is preferred, and a composition in which the above total content is 100% is more preferred. A composition in which the total content of $P_2O_5$, $Li_2O$, $Na_2O$, $K_2O$, ZnO, BaO, $Nb_2O_5$, $Bi_2O_3$, $WO_3$ and $B_2O_3$ is at least 99% is still more preferred. However, it should be understood that the above calculations of the total contents do not take into account a clarifying agent such as $Sb_2O_3$. As a clarifying agent, $Sb_2O_3$ is preferred. Desirably, $As_2O_3$ is not incorporated, since it has toxicity and has a detrimental effect on a press mold.

Further, radioactive substances such as uranium and thorium and harmful substances such as cadmium should be precluded.

When the optical glass I is imparted with the property of absorbing near infrared ray, a small amount of CuO may be incorporated. For obtaining the optical glass I that is not colored, preferably, coloring components including CuO are not incorporated.

The reasons for the limitations of the above components to the above compositional ranges in the optical glass I will be explained below.

$P_2O_5$ is a main component for constituting the network structure of the glass, and it is an essential component for carrying out stable operations and forming the glass. When the content thereof is less than 25%, the thermal stability of the glass decreases, and the climate resistance thereof also decreases. When the content thereof exceeds 44%, the viscosity of a glass melt is high, and it is difficult to introduce $Nb_2O_5$, $Bi_2O_3$ or $WO_3$, so that there may be a case where hot preform shaping is not possible. The content of $P_2O_5$ is therefore limited to 25 to 44%. The content thereof is more preferably in the range of 25 to 38%. Desirably, the content of $P_2O_5$ is 46% by weight or less.

For decreasing the glass transition temperature, the melting point and the softening temperature of the optical glass I, it is required to incorporate at least one alkali metal oxide $R_2O$ (R=Li, Na, K) of $Li_2O$, $Na_2O$ and $K_2O$. The incorporation of the alkali metal oxide also produces an effect that the liquidus temperature (glass viscosity at a liquidus temperature) is decreased, so that it is made possible to impart the glass with working properties necessary for shaping a glass for precision press-molding and a glass for press-molding. When the total content of $Li_2O$, $Na_2O$ and $K_2O$ is less than 10%, the glass transition temperature is high, and the viscosity of a glass melt at a temperature required for hot preform shaping is high, so that press-molding and preform-shaping are difficult. When the above total content exceeds 40%, the climate resistance and the thermal stability of the glass are low. In the optical glass I, therefore, the above total content is limited to 10 to 40%. The above total content is preferably in the range of 20 to 40%, still more preferably 22 to 35%. Desirably, the total content of $Li_2O$, $Na_2O$ and $K_2O$ is 10% by weight or more.

Of the alkali metal oxides, $Li_2O$ has a high effect that the glass transition temperature of the glass is decreased to a great extent, so that it is preferred to incorporate $Li_2O$ as an alkali metal oxide. When $Li_2O$ is incorporated, desirably, the content thereof is 5% or more. However, when $Li_2O$ is incorporated in an amount over 30%, the devitrification tendency of the glass increases, and the liquidus temperature of the glass may increase, so that the content of $Li_2O$ is preferably in the range of 5 to 30%, particularly preferably in the range of 7 to 25%.

For moderating the devitrification tendency caused by $Li_2O$ alone as an alkali metal oxide $R_2O$ (R=Li, Na, K), it is preferred to incorporate at least one of $Na_2O$ and $K_2O$, and it is more preferred to incorporate both of them.

Preferably, the content of $Na_2O$ is 0 to 25%, and the content of $K_2O$ is 0 to 15%. The reason is as follows. When the content of $Na_2O$ exceeds 25%, the durability and the stability of the glass are degraded. When the content of $K_2O$ exceeds 15%, it is difficult to form a glass having a low melting point. More preferably, the content of $Na_2O$ is in the range of 0 to 20%, and the content of $K_2O$ is in the range of 0 to 10%.

ZnO is a component for modifying the glass and is used for adjusting various properties of the glass. Particularly, ZnO contributes to decreasing of the melting point of the glass. However, when the content thereof exceeds 40%, the thermal stability of the glass is decreased, or the glass is caused to have an increased liquid-phase viscosity, so that the working property suitable for a glass for precision press-molding is impaired. When the content of ZnO is less than 5%, there may be a case where the low-temperature softenability and the high durability of the glass cannot be obtained. The content of ZnO is therefore limited to 5 to 40%. The content thereof is preferably in the range of 7 to 30%.

BaO is also a component for modifying the glass and is used for adjusting the various properties of the glass. Further, BaO has an effect that the climate resistance of the glass is improved. When the content thereof exceeds 35%, the low-temperature softenability of the glass may not be obtained, and the liquidus temperature of the glass may increase. When the content of BaO is less than 1%, the predetermined durability and climate resistance cannot be obtained, and the glass is extremely liable to devitrify. The content of BaO is therefore limited to 1 to 35%. The content thereof is preferably in the range of 5 to 20%.

Further, the optical glass I can contain at least one of MgO, CaO and SrO in the range of 0 to 8% in total amount.

In the optical glass I, at least one components selected from the oxide group consisting of $Nb_2O_5$, $Bi_2O_3$ and $WO_3$ is incorporated. These components drastically enhance the durability of the glass and also greatly contribute to the stability of the glass. However, when these components are incorporated to excess, the low-temperature softenability of the glass cannot be obtained. Further, the glass is liable to be colored, and the devitrification resistance of the glass is also degraded. The total content of the above three components is preferably in the range of 0.1 to 15%, more preferably in the range of 1 to 12%, still more preferably in the range of 1 to 8%, particularly preferably in the range of 2 to 8%. Concerning the content of each of $Nb_2O_5$, $Bi_2O_3$ and $WO_3$, preferably, the content of $Nb_2O_5$ is in the range of 0 to 10%, the content of $Bi_2O_3$ is 0 to 10%, and the content of $WO_3$ is in the range of 0 to 10%. In this case, a glass containing $Nb_2O_3$ and $Bi_2O_3$ and containing no $WO_3$ and a glass containing $Nb_2O_3$ or $Bi_2O_3$ and containing no $WO_3$ are further preferred.

$B_2O_3$ is a component for improving the glass in climate resistance and decreasing the dispersion of the optical properties of the glass when added in a small amount. However, when the content thereof exceeds 10%, the glass transition temperature extremely increases, and the durability of the glass is also decreased. Therefore, the content thereof is preferably limited to 0 to 10%. The content thereof is more preferably 8% or less.

$La_2O_3$, $Gd_2O_3$ and $Y_2O_3$ are components that have an effect that the climate resistance of the glass is improved, and which can be incorporated as required.

However, when the content of any one of the above oxides exceeds 5%, it is difficult to attain the desired low-temperature softenability, and the liquid-phase viscosity of the glass also tends to increase. Therefore, the content of each of $La_2O_3$, $Gd_2O_3$ and $Y_2O_3$ is limited to 0 to 5%. The content of each of these is more preferably 0 to 3%. Concerning all of the compositions of the optical glass I, the total content of $La_2O_3$, $Gd_2O_3$ and $Y_2O_3$ is preferably 0 to 5%, more preferably 0 to 3%, still more preferably 0 to 2%.

Concerning other optional components, the content of $Al_2O_3$ is 0 to 2%, and the content of $TiO_2$ is 0 to 2%. However, for improving the various properties above, preferably, none of $Al_2O_3$ and $TiO_2$ is incorporated.

Further, for imparting the glass with the function of near infrared absorption, a proper amount of CuO may be incorporated. However, for avoiding the coloring of the glass, preferably, CuO is not incorporated. For avoiding the coloring of the glass, further, Cr, V, Fe and the like should not be incorporated. In addition to these, it is not preferred to incorporate, for example, the following components. Ag, Au, Te, Se, Hf, Tl and Ni.

[Optical Glass II]

The optical glass II is an optical glass which is free of lead and fluorine, has a mass loss ratio of less than 0.25% when the optical glass is immersed in pure water, and has a glass transition temperature (Tg) of 370° C. or lower. Like the optical glass I, the optical glass II is free of lead and fluorine and exhibits a glass transition temperature (Tg) of 370° C. or lower.

The method of measuring a mass loss ratio (Dw) when an optical glass is immersed in pure water is based on "Method of measurement of optical glass for chemical durability (powder method) 06" according to Japan Optical Glass Industry Society Standard, issued in the year of 1999. In this method, glass from a new fracture surface is milled in a mortar, a glass powder is put through 710 μm openings of an auxiliary net sieve, and a glass powder that has passed through 600 μm openings of a standard net sieve (JIS Z 8801) and which still has a size of over 425 μm is collected from the above glass powder. The amount (grams) of the glass powder that is three times the specific gravity of the glass is placed in a 50-ml beaker, 15 ml of 99.5 vol % methyl alcohol is added, and a glass fine powder is removed by a gradient method. The above washing is repeated five times, and then the glass powder is dried in an air bath at 120 to 130° C. for 60 minutes and stored in a silica gel desiccator.

The thus-prepared sample in an amount equivalent to the specific gravity of the glass is placed in an elution basket of a cylindrical standard sieve made of platinum, the sieve having 177 to 210 μm openings and having a diameter of 15 mm and a height of 60 mm. The basket is shaken, then placed in a weighing bottle with a cover, and accurately weighed. The mass of the sample, obtained in this case, is taken as M1. Then, 80 ml of pure water having a pH of 6.5 to 7.5 is placed in a clean and dry round-bottom flask, a cooling tube is attached, and the flask is held in a heating device for 10 minutes. The elution basket with the sample in it is gently inserted into the round-bottom flask, treated in the heating device for 60 minutes and then taken out. Then, 80 ml of 99.5 vol % methyl alcohol is placed in a 100-ml beaker, the basket is placed therein, and the sample is washed. The above immersion and washing using methyl alcohol is repeated three times, and the powder is placed in a weighing bottle and dried in an air bath at 120 to 130° C. for 60 minutes. The dry sample is transferred into a silica gel desiccator, allowed to cool for 60 minutes, and accurately weighed in a covered state. The mass of the sample, obtained in this case, is taken as M2. As a heating device, there is used a boiling water bath that can fully accommodate that spherical portion of the round-bottom flask which has a diameter of 60 mm. The temperature of water in the water bath is adjusted such that the horizontal position 20 mm above the bottom of the round-bottom flask can maintain 99° C. or higher.

The above mass loss ratio is expressed by (M1−M2)/M1. For determining an accurate loss ratio, desirably, the above procedure is repeated twice.

When expressed by %, the loss ratio of the optical glass II measured according to the above method is 0.25% or less. In the optical glass II, the loss ratio is preferably 0.10% or less, more preferably 0.05%. The above loss ratio represents a degree of elution of a glass in water and represents dimming resistance. A glass having a large loss ratio is liable to cause dimming due to water in a washing step and in air. When the surface of an optical element undergoes dimming, the transparency of the optical element is impaired, and the optical element is no longer usable. Further, after a press-molding preform is shaped, the surface of the preform is exposed to air until the preform is precision press-molded. When a glass does not have dimming resistance represented by a loss ratio of 0.25% or less, the surface of a preform suffers dimming. When a preform having dimming is used for precision press-molding, an altered layer caused by the dimming remains on the surface of a press-molded product. The precision press-molding has a feature that the optical-function surface of a molded product (e.g., aspherical surface of an aspherical lens) is not grinded or polished, so that it is desirable to avoid the polishing employed for removing an altered layer remaining on the optical-function surface. Further, the dimming of a preform may have a detrimental effect on the molding surface of a press mold during press-molding. It is therefore required to control the loss ratio such that the loss ratio is 0.25% or less.

One of the features of the optical glass II is that the glass transition temperature thereof is remarkably low. If low climate resistance is accepted, a low-temperature moldable plastic can be used. When an optical glass to be used for an optical element has high climate resistance, the optical glass has an advantage over plastics. An optical glass that exhibits the above loss ratio attains remarkably excellent climate resistance over plastics, and such a glass is greatly useful as a glass material for an optical element that fully functions in various situations.

The optical glass II preferably has a composition containing $P_2O_5$, ZnO, BaO, at least one components selected from $Li_2O$, $Na_2O$ and $K_2O$, and at least one components selected by $Nb_2O_5$, $Bi_2O_3$ and $WO_3$. The optical glass II more preferably has a composition containing $B_2O$ and $Sb_2O_3$ in addition to the above components, in which the total content of $P_2O_5$, ZnO, BaO and the above components is at least 98%. The above total content is still more preferably at least 99%, particularly preferably 100%. When the optical glass II contains $Bi_2O_3$, the content of $TiO_2$ is preferably 0 to less than 2%, more preferably 0 to 1.5%.

Further, an optical glass having the same composition as that of the above optical glass I is also preferred.

Desirably, $As_2O_3$ is not incorporated, since it has toxicity and has a detrimental effect on a press mold. Further, radioactive substances such as uranium and thorium and harmful substances such as cadmium should be precluded. Further, for imparting the glass with the function of near infrared absorption, a proper amount of CuO may be incorporated. However, for avoiding the coloring of the glass, preferably, coloring components such as Cr, V, etc., including CuO, are not incorporated. Further, preferably, Ag, Au, Te, Se, Hf, Tl, Ni, etc., are not incorporated.

[Properties Common to the Optical Glasses I and II]

The properties common to the optical glasses I and II will be explained below.

[Liquidus Temperature and Liquid-phase Viscosity]

The liquidus temperature of the optical glass of the present invention is preferably 900° C. or lower, more preferably 850° C. or lower, still more preferably 820° C. or lower, yet more preferably 800° C. or lower. Since the liquidus temperature of the optical glass of the present invention is low as described above, the devitrification of the glass can be easily prevented when a glass shaped material is formed from a molten glass.

In the hot-shaping in which a predetermined amount of a molten glass gob is taken from a molten glass and a press-molding preform is shaped while the gob is in a softened state, there is a limitation to be imposed on the high-temperature working viscosity of the glass. From the above viewpoint, the viscosity that the glass exhibits at its liquidus temperature is preferably at least 4 dPa·s, more preferably at least 5 dPa·s. Further, the above viscosity is preferably 100 dPa·s or lower, more preferably 50 dPa·s or lower. When the viscosity of the glass at the liquidus temperature is less than 4 dPa·s, it is difficult to control a flow rate when a molten glass is allowed to flow out or drop from a pipe or a nozzle, and a press-molding preform, which is to have a predetermined weight, may not be shaped. Particularly, it is very difficult to allow a predetermined amount of a molten glass drop to drop down from a nozzle. When the above viscosity exceeds 100 dPa·s, it is difficult to separate a predetermined amount of a molten glass gob from a molten glass flow without a cutting blade. When an attempt is made to increase a temperature to decrease the viscosity of the glass for separating a glass gob from a molten glass flow, components in a glass during shaping are liable to volatilize, so that there is caused a problem that surface striae are liable to occur.

The viscosity of the glass at its liquidus temperature is more preferably 5 to 50 dPa·s, particularly preferably 10 to 50 dPa·s.

[Chemical Durability]

The chemical durability of the optical glass of the present invention will be explained below. The chemical durability can be quantitatively evaluated on the basis of the degree of light scattering caused by a haze that occurs on the polished surface of an optical glass placed in a predetermined environment.

The measurement of the above degree of light scattering can be carried out by a method based on "Method of measuring optical glass for chemical durability (surface method) 07" of the above Japan Optical Glass Industry Society. First, there is provided a sample formed of a glass to be measured, the sample having two optically polished surfaces in parallel with each other. When a sample having a size sufficiently large for carrying out the above measurement cannot be obtained since it is from a small preform or optical element, a sample formed of a glass having the same composition can be prepared and used. The above optical polishing refers to the polishing of the two surfaces so that the surfaces are in a polished state equivalent to the surface average roughness Ra of the optical-function surface of an optical element such as a lens. Specifically, the standard that can be employed is a polished state in which the surface average roughness Ra of each polished surface is sufficiently smaller than, for example, $\frac{1}{10}$ of, the wavelength on the short wavelength side in the visible light region. Further, a sample in a clean state is used. Such a sample is held, for example, in a constant-temperature constant-humidity chamber (air as atmosphere) at a temperature of 65° C. and at a relative humidity of 90% for 1 week. Desirably, the above air is clean, for example, cleaner than class 1000, and air cleaner than class 100 is preferred. Then, the optically polished surface of the sample that has been held for 1 week is irradiated with perpendicular white light (C light source or standard light C), and the white light is measured for an incidence light intensity and an intensity of light transmitted through the sample during the irradiation. And, it is determined that scattered light intensity has a value obtained by deducting the transmitted light intensity from the incidence light intensity, and a ratio of the scattered light intensity and the transmitted light intensity (scattered light intensity/ transmitted light intensity) is determined. When the above ratio is smaller, it means that a glass has a smaller degree of occurrence of haze and higher chemical durability.

The ratio of the scattered light intensity and the transmitted light intensity (scattered light intensity/transmitted light intensity) obtained by the above measurement is preferably 0.08 or less, more preferably 0.03 or less. These values are called haze values when expressed by %. Therefore, the haze value is preferably 8% or less, more preferably 3% or less.

A glass having a larger ratio of the scattered light intensity and the transmitted light intensity than the above range is a so-called low-chemical-durability glass, which shows a high rate of corrosion caused by water drops or water vapors adhering to the glass and various chemical components such as gases in a use environment, or a high rate of the formation of a reaction product on the glass surface. When such a glass is used for an optical glass, a foreign matter is formed on the optical glass element surface due to the corrosion of the glass or a formed substance on the glass surface, and the optical properties such as transmittance, and the like may degraded, so that such a glass is not preferred as an optical glass composition. In contrast, a glass having chemical durability in the above range can give practical and highly reliable optical elements.

In a pickup lens for reading information of an optical disk such as a compact disk or DVD or for reading and writing information, light passes through the pickup lens and enters an optical disk, and the same pickup lens picks up light reflected from the disk and introduces it into a light detector. Therefore, light passes through the pickup lens at least twice. If the above foreign matter or a haze is even slightly present on the lens surface, light signals suffer a large loss. While light having a shorter wavelength tends to be used for increasing the recording density, such a light source still has a low-level output, so that it is strongly demanded to control a loss in an optical system so as to make it as small as possible. The above can be also true of a collimator lens used for writing and reading in an optical disk.

Having excellent durability and climate resistance as described above, the optical glass of the present invention is particularly suitable as a material for a lens that is arranged in an optical path where light passes and returns like the above pickup lens.

[Refractive Index (nd) and Abbe's Number (vd)]

The optical properties of the optical glass will be explained below.

For providing a glass having excellent climate resistance and having excellent low-temperature shapeability and moldability while realizing the above remarkably low glass transition temperature, the optical glass I and the optical glass II preferably have a refractive index (nd) of 1.52 to 1.7 and an Abbe's number (vd) of 42 to 70.

Further, the refractive index (nd) range of 1.52 to 1.7 and the Abbe's number (vd) range of 42 to 70 are positioned in the middle of the refractive index (nd) range and the Abbe's number (vd) range of generally used optical glasses. With downsizing of optical devices and machines and mobile items, there is desired an optical system in which the number of lenses is made as small as possible. Under the circumstances, the optical glasses having optical constants in the above ranges are particularly useful.

[Use of Optical Glass]

While the optical glass of the present invention is used as a material for an aspherical lens, lens elements such as a microlens, a pickup lens and a collimator lens, a diffraction grating, a lens with a grating, a prism, and the like, and is further used as a material for various optical elements to be described in detail later, it is particularly suitable as a material for a press-molding preform for and further remarkably suitable as a material for a precision press-molding preform.

The press-molding preform refers to a glass shaped material to be press-molded in a softened state under heat. It is formed of a glass having a weight equivalent to a press-molded product (article) and has a form suitable for press-molding (e.g., a sphere, an ellipsoid of revolution, a form obtained by flattening an ellipsoid of revolution in the revolution axis direction, or the like).

The precision press-molding refers to a method in which a glass in a softened state under heat is press-molded with a press mold to transfer a form (pattern) of a molding surface of the press mold to the glass. An optical element formed by molding according to the above method has a highly accurately molded optical-function surface, which does not require any mechanical processing. The optical-function surface refers to a surface required to perform function(s) of an optical element that refracts light, reflects light or diffracts light, such as an aspherical surface of an aspherical lens or a surface where a grating of a diffraction grating is formed.

<Press-Molding Preform and Process for Preparation Thereof>

The press-molding preform (preform for press-molding), provided by the present invention, is formed of the above optical glass I or II. The preform therefor has the properties of the optical glass of the present invention, and an optical element produced from the preform eventually has the properties of the above optical glass.

The press-molding preform is formed of the optical glass of the present invention, so that the preform is free of devitrification and striae and is excellent in climate resistance and chemical durability. Further, having a low glass transition temperature of 370° C. or lower, preferably 360° C. or lower, the preform is particularly suitable as a precision press-molding preform. As a glass for precision press-molding, the glass has a remarkably low glass transition temperature, so that the preform can be press-molded in a temperature range below and including 400° C. Further, not only a press mold generally used in precision press-molding such as a mold formed of SiC or an ultra-hard alloy can be naturally used, but also a press mold formed of stainless steel can be used. When a press mold formed of SiC or an ultra-hard alloy is used, the pressing temperature can be set at a low temperature, so that a load on the press mold is decreased. As a result, the lifetime of the press mold can be extended.

When a press-molding preform is placed in a press mold and when the radius Rp of the preform (corresponding to the radius of a sphere when the preform is spherical) is greater than the radius Rm of curvature of the molding surface of the press mold (corresponding to the radius of curvature of an approximate spherical surface of a portion having a greatest curvature when the molding surface is aspherical) if viewed in the pressing direction, there is formed a closed space between the preform and the molding surface of the press mold. If the press-molding is carried out in the above state, gas trapped in the above closed space is not released, and a dent is formed in the surface of a press-molded product, so that the press-molded article is defective in form. The above problem is called defectiveness caused by a gas trap. According to the press-molding preform, provided by the present invention, the glass viscosity can be decreased during a pressing operation without exerting any large thermal load on a press mold, so that the gas trap is not easily formed. Therefore, not only press-molding under $R_p \leq R_m$ but also press-molding under $R_p > R_m$ can be excellently carried out.

Since the press-molding preform, provided by the present invention, is formed of the optical glass excellent in climate resistance and chemical durability, an altered layer such as dimming is not easily formed on the preform surface before the preform is press-molded, so that there is no need to remove the altered layer before the press-molding.

Therefore, excellent press-molding can be carried out, and a press-molded product is free of a defect caused by the above altered layer. The preform of the present invention is therefore particularly suitable as a precision press-molding preform.

The press-molding preform is a glass shaped material having a weight equivalent to the weight of a press-molded product as explained already. The preform has a form shaped in a proper form depending upon the form of a press-molded article to be obtained, and the preform is heated so as to have a press-moldable viscosity before it is press-molded.

The surface of the press-molding preform, particularly the precision press-molding preform, may be provided with a film having a release function to prevent the fusion between the molding surface of a press mold and the glass, may be provided with a film having a lubricant function to easily extend the glass in a press mold, or may be provided with a film having both of these functions.

The above preform preferably has a smooth clean surface. Therefore, the preform is preferably formed by separating a predetermined amount of a molten glass gob from a molten glass flow and applying gas pressure to the molten glass gob in a floating state. Further, the preform preferably has a surface formed of a free surface. Further, the preform is preferably free of a cutting mark called a shear mark. The shear mark is generated when a flowing molten glass is cut with a cutting blade. When the shear mark remains in a precision press-molded product, the shear mark portion constitutes a defective portion. The preform is therefore free of such a shear mark.

The process for preparing a preform, provided by the present invention, is a so-called hot shaping method. In the hot shaping method, a molten glass having a predetermined weight is shaped into a preform having the above predetermined weight. For example, a predetermined amount of a molten glass that has flowed out from a flow pipe is separated, and the separated molten glass gob is shaped into a preform while it is in a softened state.

For separating a predetermined amount of a molten glass, desirably, no cutting blade is used, so that no shear mark is generated. The separation method using no cutting blade includes a method in which a molten glass is dropped from a flow pipe, a method in which a forward end portion of a molten glass flow flowing out from a flow pipe is held with a support and the support is removed timely when a molten glass gob having a predetermined weight can be separated, and a method in which the forward end portion of a molten glass flow is received with a receiving mold and, at the above timing, the receiving mold is moved downward at a speed higher than the speed of the molten glass flowing downward. In this manner, a glass can be separated at a narrow-diameter portion that occurs between the forward end side and the flow pipe side of the molten glass flow.

Then, while the obtained molten glass gob is in a softened state, it is shaped into a form suitable for press-molding. The above shaping of the molten glass gob is preferably carried out in a state where the molten glass gob or the glass gob being shaped is allowed to float by application of gas pressure. When the glass is shaped in a floated state, there can be shaped a preform whose surface is smooth and clean.

<Optical Element and Process for Producing the Element>

The optical element and the process for producing the optical element will be explained below. The optical element of the present invention is formed of the optical glass I or II. In the present invention, the glass constituting the optical element is the optical glass I or II, so that the optical element has the properties of the above optical glass and can maintain high reliability for a long period of time on the basis of the above optical constants (refractive index (nd) 1.52 to 1.7 and Abbe's number (vd) 42 to 70), excellent climate resistance and excellent chemical durability of the optical glass.

Examples of the optical element of the present invention include various lenses such as a spherical lens, an aspherical lens, a microlens and a rod lens, a diffraction grating, a lens with a diffraction grating, a lens array, a prism, a filter and the like. Desirably, the above optical element is a product formed by heating and softening the preform and precision press-molding it.

The above optical element may have an optical thin film such as an anti-reflection film, a total reflection film, a partial reflection film or a film having spectral properties, as required.

In the process for producing an optical element, provided by the present invention, the above preform or the press-molding preform, produced by the above process for producing a press-molding preform, is heated, softened and press-molded into the optical element. In the present invention, preferably, the above preform is heated, softened and precision press-molded into the optical element.

According to the present invention, the preform has excellent press-moldability, particularly, excellent precision press-moldability, so that there can be highly productively produced optical elements having predetermined optical constants (refractive index (nd) of 1.52 to 1.7 and Abbe's number (vd) of 42 to 70). Further, the preform having excellent climate resistance is used, so that there can be also produced an optical element that can maintain high reliability for a long period of time.

The optical element produced by the production method of the present invention is the same as the above-explained optical element.

In the precision press-molding, a preform softened under heat is press-molded with a press mold having a molding surface having a predetermined surface, to precisely transfer the form of the above molding surface to the glass constituting the preform. The press-molded product has a form that is, or is very close to, the form of an end product. The surface to which the form of the molding surface has been transferred has surface accuracy equivalent to the surface accuracy of the end product as well. Therefore, a molding surface having an inversion form of the surface where the aspherical surface of an aspherical lens or the grating of a diffraction grating is formed, and the precision press-molding is carried out, whereby a surface where the above aspherical surface or grating is formed can be formed without grinding or polishing. Further, besides the surface where the aspherical surface or grating is formed, a molding surface of a press mold is precisely transferred to optical-function surfaces of optical elements, whereby the optical-function surfaces can be highly productively produced without machining. In the precision press-molding, an optical element can be produced by press-molding alone without any machining process. Alternatively, part or the whole of an optical-function surface is formed by press-molding, and a portion that permits a machining process such as the process of centering of a lens may be machined.

In the precision press-molding, desirably, the press-molding is carried out in a non-oxidizing atmosphere such as a nitrogen gas atmosphere or an atmosphere of a mixture of a nitrogen gas and a hydrogen gas for reducing damage that may be caused on a press mold by oxidation.

In the process for producing an optical element, provided by the present invention, the temperature for heating a press mold during the press-molding can be set at less than 400° C., since the press-molding preform has a remarkably low glass transition temperature. Therefore, stainless steel that is surface-roughened and embrittled at a high temperature over 400° C. can be used as a press mold material. Stainless steel is a material that permits not only grinding but also cutting and which also permits electric discharge machining, so that a molding surface having a complicated form or a molding surface for forming the aspherical surface of an aspherical lens by transfer can be highly accurately produced. By applying a press mold formed of stainless steel to the press-molding in the process for producing an optical element, provided by the present invention, therefore, an optical element having a more complicated form or a lens having a large thickness as compared with an effective diameter can be easily produced by precision press-molding. For example, there can be easily produced a holography optical element, a micro Fresnel lens, a prism having a light incidence surface that is not flat but spherical or aspherical, an anamorphotic lens, a microlens array, and the like. Particularly, a mold for producing a lens having a large thickness as compared with an effective diameter, which mold has been difficult to make by grinding, can be highly accurately prepared by cutting or electric discharge machining. In a mold for producing such a lens by press-molding, it is required to engrave a form on a mold material at a large angle with regard to the surface thereof. Impractically, the grinding not only involves technical difficulties, but also requires a time and a cost.

Therefore, the press-molding preform, the optical element and the process for producing the optical element, provided by the present invention, are preferably applied to a lens having an effective diameter of 1.0 to 4.0 mm and a thickness of 0.8 to 3.0 mm, more preferably to a lens having an effective diameter of 1.3 to 3.8 mm and a thickness of 1.0 to 2.8 mm, still more preferably to a lens having an effective diameter of 1.3 to 3.5 mm and a thickness of 1.0 to 2.5 mm. They are particularly preferably applied to an aspherical lens.

Further, desirably, the press-molding preform, the optical element and the process for producing the optical element, provided by the present invention, are applied to a lens having a numeral aperture (NA) of 0.6 or more, more preferably to a lens having a numeral aperture (NA) of 0.65 or more, still more preferably to a lens having a numeral aperture (NA) of 0.75 or more, yet more preferably to a lens having a numeral aperture (NA) of 0.80 or more, particularly preferably to a lens having a numeral aperture (NA) of 0.85 or more.

A lens having the above effective diameter and thickness or a lens having the above numerical aperture is suitable as a pickup lens for writing and reading information in optical recording media such as an optical recording medium (optical disk), a magneto-optical recording disk, and the like. Further, being formed of the optical glass of the present invention, the optical element of the present invention has a high transmittance in a wavelength region of visible light to near infrared and is suitable for a pickup lens for writing and reading information with light in the wavelength range of 400 to 850 nm. Particularly, the optical element of the present invention is effective in the wavelength region of 400 to 455 nm and in the wavelength region of 770 to 840 nm. The optical element of the present invention is suitable for a pickup lens or a collimator for use with a light-emitting device or semiconductor laser that emits light in the above wavelength region. Further, being formed of the optical glass having excellent durability and climate resistance, the optical element of the present invention is particularly suitable as a lens positioned in a light path where light passes and returns, such as a pickup lens.

Examples of the stainless steel used as a press mold material include steel containing at least 12% by weight or chromium, martensite stainless steel, ferrite stainless steel, austenite stainless steel and other stainless steel used for a mold for plastics.

The press mold, the mold release film and press-molding conditions may be selected from those that are known, as required. The optical element obtained is annealed as required, or optical thin film(s) such as an anti-reflection film, a reflection film having a wavelength selection function, a total reflection film, etc., is/are formed for practical use.

EXAMPLES

The present invention will be explained with reference to Examples hereinafter, while the present invention shall not be limited by these Examples.

Example 1

As raw materials for glass components, corresponding oxides, carbonates, sulfates, nitrates, phosphates, hydroxides, etc., in an amount of 250 to 300 g were weighed in predetermined amount ratios shown in Tables 1, 3 and 5 and fully mixed to prepare a formulated batch. The batch was placed in a platinum crucible and melted at 1,100 to 1,300° C. with stirring in air for 2 to 4 hours. After the glass was melted, a glass melt (molten glass) was cast into a 40×70×15 mm carbon mold and allowed to cool to a glass transition temperature. Immediately thereafter, the glass was placed in an annealing furnace, annealed around a glass transition temperature for about 1 hour and allowed to cool to room temperature in the annealing furnace. The thus-obtained glass was observed through a microscope, to show no precipitation of a crystal.

Each optical glass was measured for a refractive index (nd), an Abbe's number (vd), a glass transition temperature (Tg), a liquidus temperature (LT) and chemical durability by the following methods. Tables 2,4 and 6 show the results together with Dw.

(1) Refractive Index (nd) and Abbe's Number (vd)

An optical glass obtained at a gradual-cooling temperature-decrease rate of −30° C./h.

(2) Glass Transition Temperature (Tg)

A sample was measured with a thermo-mechanical analyzer supplied by Rigakudenki K. K., at a temperature elevation rate of 4° C./minute.

(3) Liquidus Temperature (LT)

A glass was placed in a 50-ml platinum crucible, and the crucible was held in a devitrification testing furnace having a temperature gradient from 400° C. to 1,100° C. for 2 hours. After the glass was cooled, an inside of the glass was observed through a microscope having a magnification of 100 times for the presence or absence of a crystal, on the basis of which the liquidus temperature was determined.

(4) Chemical Durability (Intensity of Scattered Light/ Intensity of Transmitted Light)

Measurement was made with an automatic hazemeter (TC-HIIIDPK) supplied by Tokyo Denshoku. Concerning optical conditions, standard light C of JIS K7105 integrating-sphere method was used, and a halogen lamp 12V, 50 W, 2000 H was used as a light source.

The value obtained by the above measurement is called haze value when expressed by %.

TABLE 1

| No. | Unit b | $P_2O_5$ | $Li_2O$ | $Na_2O$ | $K_2O$ | ZnO | BaO | $Nb_2O_5$ | $Bi_2O_3$ | $B_2O_3$ | Total |
|---|---|---|---|---|---|---|---|---|---|---|---|
| 1-1 | Mole | 36.03 | 10.48 | 11.49 | 4.38 | 13.97 | 20.17 | 2.79 | 0.70 | 0.00 | 100.00 |
| | Weight | 43.20 | 2.64 | 6.01 | 3.48 | 9.60 | 26.05 | 6.26 | 2.75 | 0.00 | 100.00 |
| 1-2 | Mole | 36.03 | 11.87 | 13.58 | 4.38 | 10.48 | 20.17 | 2.79 | 0.70 | 0.00 | 100.00 |
| | Weight | 43.61 | 3.02 | 7.18 | 3.52 | 7.27 | 26.31 | 6.32 | 2.78 | 0.00 | 100.00 |

TABLE 1-continued

| No. | Unit b | P$_2$O$_5$ | Li$_2$O | Na$_2$O | K$_2$O | ZnO | BaO | Nb$_2$O$_5$ | Bi$_2$O$_3$ | B$_2$O$_3$ | Total |
|---|---|---|---|---|---|---|---|---|---|---|---|
| 1-3 | Mole | 33.49 | 14.36 | 12.57 | 4.50 | 10.77 | 20.73 | 2.87 | 0.72 | 0.00 | 100.00 |
|  | Weight | 41.23 | 3.71 | 6.76 | 3.68 | 7.60 | 27.50 | 6.61 | 2.91 | 0.00 | 100.00 |
| 1-4 | Mole | 36.04 | 10.49 | 10.51 | 4.34 | 13.86 | 22.68 | 0.00 | 0.69 | 1.39 | 100.00 |
|  | Weight | 44.47 | 2.72 | 5.66 | 3.55 | 9.80 | 30.16 | 0.00 | 2.79 | 0.84 | 100.00 |

(Values show percentages)

TABLE 2

| No. | Dw (%) | Tg (° C.) | nd | νd | LT* | Haze value (%) | Specific gravity |
|---|---|---|---|---|---|---|---|
| 1-1 | 0.05 | 336 | 1.60199 | 51.89 | Less than 750° C. | 1.1 | 3.425 |
| 1-2 | 0.03 | 332 | 1.59768 | 51.92 | Less than 750° C. | 2.7 | 3.385 |
| 1-3 | 0.03 | 338 | 1.60551 | 50.79 | Less than 750° C. | 0.3 | 3.435 |
| 1-4 | 0.01 | 327 | 1.58235 | 59.42 | Less than 750° C. | 5.8 | 3.433 |

*LT = Liquidus Temperature

TABLE 3

| No. | Unit b | P$_2$O$_5$ | Li$_2$O | Na$_2$O | K$_2$O | ZnO | BaO | Nb$_2$O | Bi$_2$O$_3$ | B$_2$O$_3$ | Total |
|---|---|---|---|---|---|---|---|---|---|---|---|
| 1-5 | Mole | 36.03 | 10.48 | 11.49 | 4.38 | 13.97 | 20.17 | 1.40 | 0.70 | 1.40 | 100.00 |
|  | Weight | 44.20 | 2.70 | 6.16 | 3.56 | 9.83 | 26.67 | 3.22 | 2.82 | 0.84 | 100.00 |
| 1-6 | Mole | 31.72 | 16.09 | 11.87 | 4.58 | 10.97 | 21.12 | 2.93 | 0.73 | 0.00 | 100.00 |
|  | Weight | 39.52 | 4.21 | 6.46 | 3.78 | 7.84 | 28.36 | 6.84 | 2.99 | 0.00 | 100.00 |
| 1-7 | Mole | 36.00 | 10.40 | 10.40 | 4.00 | 14.00 | 23.00 | 0.00 | 0.70 | 1.50 | 100.00 |
|  | Weight | 44.32 | 2.69 | 5.59 | 3.26 | 9.88 | 30.52 | 0.00 | 2.83 | 0.91 | 100.00 |
| 1-8 | Mole | 36.00 | 14.40 | 10.40 | 0.00 | 14.00 | 23.00 | 0.00 | 0.70 | 1.50 | 100.00 |
|  | Weight | 45.33 | 3.81 | 5.72 | 0.00 | 10.11 | 31.21 | 0.00 | 2.89 | 0.93 | 100.00 |

(Values show percentages)

TABLE 4

| No. | DW (%) | TG (° C.) | nd | νd | LT* | Haze value (%) | Specific gravity |
|---|---|---|---|---|---|---|---|
| 1-5 | 0.02 | 327 | 1.59059 | 55.50 | Less than 800° C. | 4.6 | 3.395 |
| 1-6 | 0.05 | 339 | 1.61130 | 49.82 | Less than 700° C. | 0.4 | 3.473 |
| 1-7 | 0.03 | 331 | 1.58397 | 59.28 | Less than 750° C. | 5.2 | 3.445 |
| 1-8 | 0.03 | 333 | 1.59167 | 59.34 | Less than 800° C. | 2.9 | 3.478 |

*LT = Liquidus Temperature

TABLE 5

| No. | Unit b | P$_2$O$_5$ | Li$_2$O | Na$_2$O | K$_2$O | ZnO | BaO | Nb$_2$O$_5$ | Bi$_2$O$_3$ | B$_2$O$_3$ | other | Total |
|---|---|---|---|---|---|---|---|---|---|---|---|---|
| 1-9 | Mole | 36.0 | 10.4 | 10.4 | 4.0 | 12.0 | 23.0 | 0.0 | 0.7 | 1.5 | CaO = 2.0 | 100.0 |
|  | Weight | 44.5 | 2.7 | 5.6 | 3.3 | 8.5 | 30.6 | 0.0 | 2.8 | 0.9 | CaO = 1.0 | 100.0 |
| 1-10 | Mole | 36.0 | 10.4 | 10.4 | 4.0 | 12.0 | 23.0 | 0.0 | 0.7 | 1.5 | MgO = 2.0 | 100.0 |
|  | Weight | 44.6 | 2.7 | 5.6 | 3.3 | 8.5 | 30.7 | 0.0 | 2.8 | 0.9 | MgO = 0.7 | 100.0 |
| 1-11 | Mole | 36.0 | 10.4 | 10.4 | 4.0 | 12.0 | 23.0 | 0.0 | 0.7 | 0.5 | CaO = 3.0 | 100.0 |
|  | Weight | 44.6 | 2.7 | 5.6 | 3.3 | 8.5 | 30.7 | 0.0 | 2.8 | 0.3 | CaO = 1.5 | 100.0 |
| 1-12 | Mole | 32.5 | 17.8 | 13.0 | 4.5 | 9.5 | 17.0 | 1.9 | 1.8 | 0.0 | WO$_3$ = 2.0 | 100.0 |
|  | Weight | 39.8 | 4.6 | 7.0 | 3.7 | 6.7 | 22.5 | 4.4 | 7.3 | 0.0 | WO$_3$ = 4.0 | 100.0 |
| 1-13 | Mole | 34.5 | 13.8 | 13.0 | 4.5 | 9.5 | 20.0 | 3.5 | 1.2 | 0.0 | 0.0 | 100.0 |
|  | Weight | 41.3 | 3.5 | 6.8 | 3.6 | 6.5 | 25.8 | 7.8 | 4.7 | 0.0 | 0.0 | 100.0 |
| 1-14 | Mole | 32.5 | 15.8 | 15.0 | 4.5 | 9.5 | 18.0 | 3.5 | 1.2 | 0.0 | 0.0 | 100.0 |
|  | Weight | 40.4 | 4.1 | 8.1 | 3.7 | 6.7 | 24.0 | 8.1 | 4.9 | 0.0 | 0.0 | 100.0 |

TABLE 5-continued

| No. | Unit b | $P_2O_5$ | $Li_2O$ | $Na_2O$ | $K_2O$ | ZnO | BaO | $Nb_2O_5$ | $Bi_2O_3$ | $B_2O_3$ | other | Total |
|---|---|---|---|---|---|---|---|---|---|---|---|---|
| 1-15 | Mole | 32.5 | 15.8 | 15.0 | 4.5 | 9.5 | 17.0 | 2.5 | 1.2 | 0.0 | $WO_3$ = 2.0 | 100.0 |
|  | Weight | 40.1 | 4.1 | 8.1 | 3.7 | 6.7 | 22.6 | 5.8 | 4.9 | 0.0 | $WO_3$ = 4.0 | 100.0 |

(Value show percentages)

TABLE 6

| No. | Dw (%) | Tg (° C.) | n d | ν d | L T* | Haze value (%) | Specific gravity |
|---|---|---|---|---|---|---|---|
| 1-9 | 0.035 | 328 | 1.58366 | 59.67 | Less than 750° C. | 3.3 | 3.431 |
| 1-10 | 0.031 | 334 | 1.58272 | 59.76 | Less than 750° C. | 2.8 | — |
| 1-11 | 0.033 | 326 | 1.58359 | 59.67 | Less than 770° C. | 2.5 | 3.442 |
| 1-12 | 0.021 | 325 | 1.61402 | 47.63 | Less than 700° C. | 0.7 | 3.495 |
| 1-13 | 0.027 | 331 | 1.61292 | 48.56 | Less than 700° C. | 0.3 | 3.448 |
| 1-14 | 0.019 | 329 | 1.61116 | 47.85 | Less than 700° C. | 0.8 | 3.407 |
| 1-15 | 0.026 | 325 | 1.60866 | 48.07 | Less than 670° C. | 4.6 | 3.438 |

*LT = Liquidus Temperature

Example 2

The optical glass obtained in Example 1 was shaped into spherical preforms having a diameter of 2 to 30 mm with a hot preform floating shaping apparatus shown in FIG. 1. The preforms were shaped so as to have weights equivalent to weights of press-molded products to be produced. FIG. 1 shows a schematic cross-sectional view of the preform shaping apparatus, in which numeral 21 indicates a molten glass, 22 indicates a glass drop, 23 indicates a preform-shaping mold, and 24 indicates a temperature-control portion.

Figure 2:
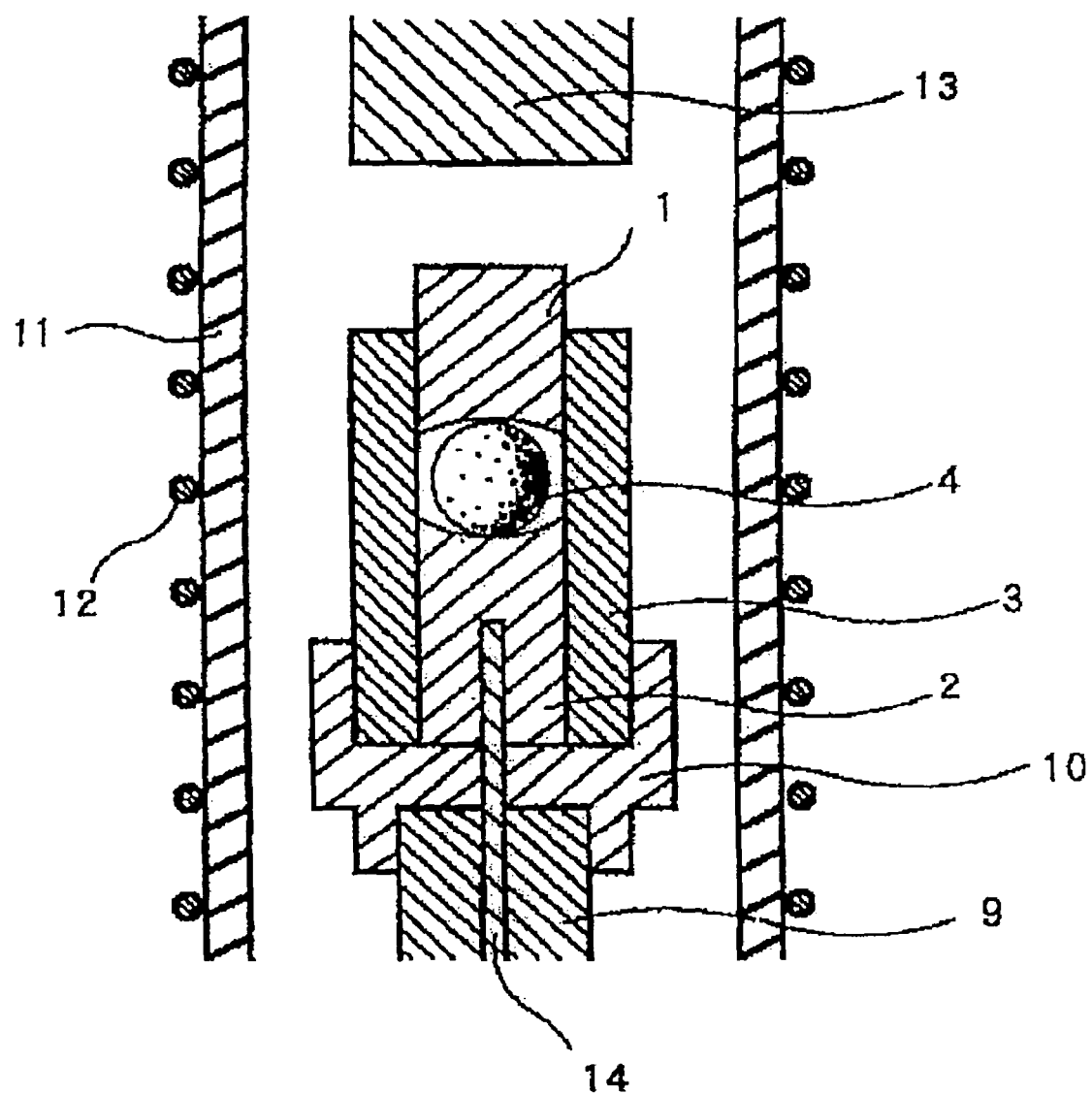
FIG. 2 is a schematic cross-sectional view of a precision press-molding apparatus used in Examples.

Then, the above preforms were molded as follows by means of a precision press-molding apparatus shown in FIG. 2. A preform 4 was placed between a lower mold member 2 formed of stainless steel having a spherical or aspherical surface form and an upper mold member 1 formed of stainless steel in the precision press-molding apparatus. An inside of a quartz tube 11 was filled with a nitrogen atmosphere, and a heater 12 is electrically powered to heat the inside of the quartz tube 11. The heater temperature was set such that the temperature inside the mold was 395° C., and while the temperature was maintained, a pressing rod 13 was moved downward to press the upper mold member 1, whereby the preform 4 in the mold was press-molded. The molding pressure was set at 8 MPa, and the molding time period was set for 30 seconds. After the press-molding, the molding pressure was decreased, a glass molded product formed by the press-molding was gradually cooled to a temperature lower than the glass transition temperature by 30° C. in a state where the lower mold member 2 and the upper mold member 1 were in contact with the glass molded product. Then, the glass molded product was rapidly cooled to room temperature to give an aspherical lens. The aspherical lens was then taken out of the mold. The thus-obtained aspherical lenses were remarkably highly accurate optical lenses. In FIG. 2, numeral 3 indicates a guide mold member (sleeve), 9 indicates a support rod, 10 indicates a base, and 14 indicates a thermocouple.

Example 3

A pattern having an inversion form of a diffraction grating pattern was formed on a molding surface of a mold formed of stainless steel by cutting, and a press-mold consisting of a lower mold member and an upper mold member was prepared.

A preform that was the same as a preform used in Example 2 was press-molded under the same conditions as those in Example 2, whereby a diffraction grating was obtained. In this manner, excellent diffraction gratings were obtained.

Example 4

A pattern having an inversion form of a Fresnel lens pattern was formed on a molding surface of a mold formed of stainless steel by cutting, and a press mold consisting of a lower mold member and an upper mold member for forming a Fresnel lens was prepared.

A preform that was the same as a preform used in Example 2 was press-molded under the same conditions as those in Example 2, whereby a Fresnel lens was obtained. In this manner, excellent Fresnel lenses were obtained.

Example 5

A pattern having an inversion form of a diffraction grating pattern was formed on a molding surface of a mold formed of stainless steel by cutting, and a press mold consisting of a lower mold member and an upper mold member was prepared.

A preform that was the same as a preform used in Example 2 was press-molded under the same conditions as those in Example 2, whereby a lens with a diffraction grating was obtained. Incidentally, the lens may be a spherical lens or an aspherical lens. In this manner, excellent lenses with a diffraction grating each were obtained.

Effect of the Invention

According to the present invention, there can be provided an optical glass that is free of lead and fluorine, which has a low glass transition temperature permitting press-molding with a mold formed of stainless steel, and which has high climate resistance.

According to the present invention, there can be also provided a press-molding preform, which is formed of the above glass, which has a low glass transition temperature permitting press-molding with a mold formed of stainless steel, and which is used for producing an optical element having high climate resistance by press-molding, and a process for preparing the preform.

According to the present invention, further, there can be provided an optical element which is formed of the above glass, which has a glass transition temperature permitting press-molding with a mold formed of stainless steel and which has high climate resistance, and a process for producing an optical element by press-molding the above preform.

The invention claimed is:

1. An optical glass comprising, by mol%, 25 to 44% of $P_2O_5$, 10 to 40% of a total of $Li_2O$, $Na_2O$ and $K_2O$, 5 to 40% of ZnO, 1 to 35% of BaO, $Nb_2O_5$ and $Bi_2O_3$, wherein the total content of $P_2O_5$, $Li_2O$, $Na_2O$, $K_2O$, ZnO, BaO, $Nb_2O_5$, $Bi_2O3$, $WO_3$ and $B_2O_3$ is at least 99%, the optical glass having a glass transition temperature (Tg) of 370° C. or lower and being free of lead and fluorine.

2. An optical glass as recited in claim 1, which contains, by mol%, 5 to 30% of $Li_2O$, 0 to 25% of $Na_2O$, 0 to 15% of $K_2O$, 0.1 to 15% of a total of $Nb_2O_5$, $Bi_2O_3$ and $WO_3$, 0 to 10% of $B_2O_3$, 0 to 5% of $Gd_2O_3$ and 0 to 5% of $Y_2O_3$, wherein the total content of $P_2O_5$, ZnO, BaO and said components is at least 96%.

3. An optical glass recited in claim 1, which is free of lead and fluorine, has a mass loss ratio of less than 0.25% when the optical glass is immersed in pure water (100° C., 60 minutes), and has a glass transition temperature (Tg) of 370° C. or lower.

4. An optical glass as recited in claim 1, which has a refractive index (nd) of 1.52 to 1.7 and an Abbe's number (vd) of 42 to 70.

5. A press-molding preform formed of the optical glass recited in claim 1.

6. A process for producing an optical element, which comprises heating the press-molding preform recited in claim 5.

7. A process for preparing a press-molding preform, which comprises shaping a molten glass of the optical glass recited in claim 1 while the molten glass having a predetermined weight is in a softened state, into the preform having a weight equivalent to said predetermined weight.

8. An optical element formed of the optical glass recited in claim 1.

* * * * *